United States Patent [19]
Miller

[11] Patent Number: 4,750,775
[45] Date of Patent: Jun. 14, 1988

[54] ENGINE OIL LEAK CATCH PAN

[76] Inventor: Marshall B. Miller, 4634 Northwood Ter., Sarasota, Fla. 33580

[21] Appl. No.: 49,842

[22] Filed: May 15, 1987

[51] Int. Cl.[4] .............................................. B62D 25/20
[52] U.S. Cl. ..................................... 296/38; 180/69.1; 184/106
[58] Field of Search .................... 296/38; 180/69.1 X; 184/106 X

[56] References Cited

U.S. PATENT DOCUMENTS

| | | | |
|---|---|---|---|
| 3,329,231 | 7/1967 | Takenouchi | 180/69.1 |
| 3,354,988 | 11/1967 | Leonard | 296/38 |
| 3,651,884 | 3/1972 | Dorris | 180/69.1 |
| 4,577,713 | 3/1986 | Moon | 180/69.1 |
| 4,695,088 | 9/1987 | Jensen | 296/38 |

Primary Examiner—Robert R. Song
Attorney, Agent, or Firm—Charles J. Prescott; Raymond H. Quist

[57] ABSTRACT

A disposable catch pan for catching and holding engine oil which leaks from the joint between the engine and the transmission housing is disclosed. In one embodiment the catch pan has an oil impervious shell and contains a medium providing a porous filling or a filling providing interstices. The filling serves to retard movement of the held oil. In another embodiment the catch pan is formed of absorbant material. This embodiment may also have an oil impervious shell.

12 Claims, 1 Drawing Sheet

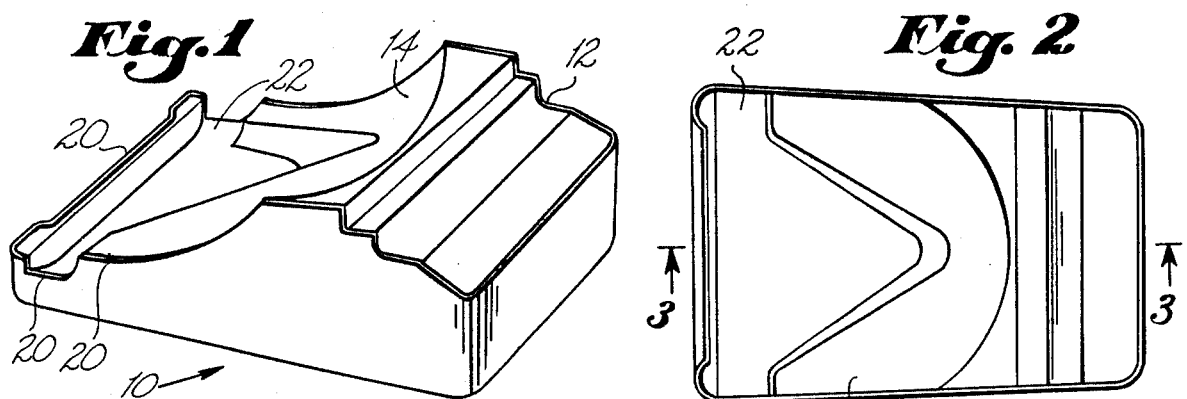
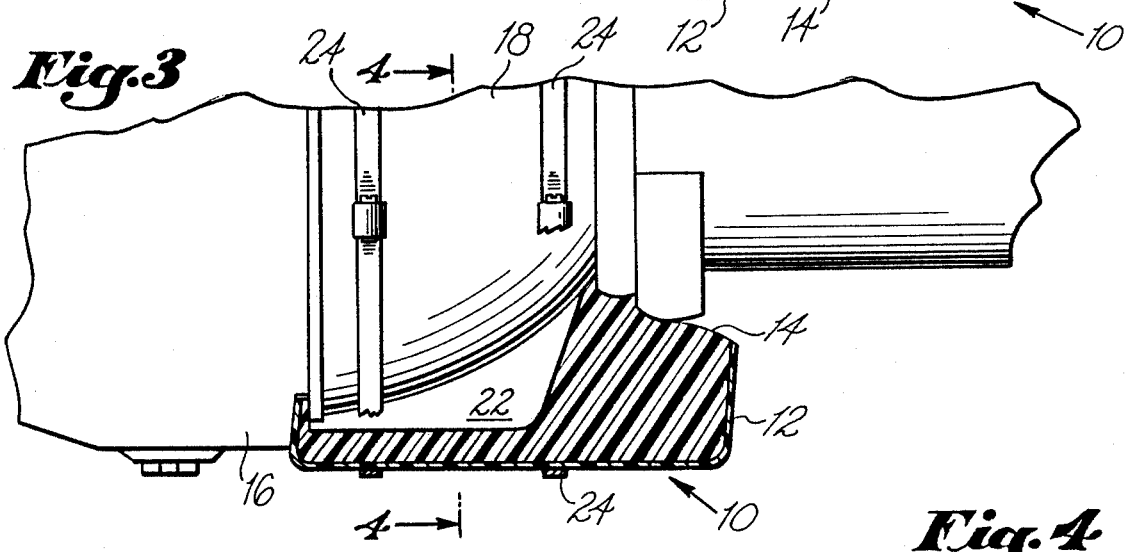
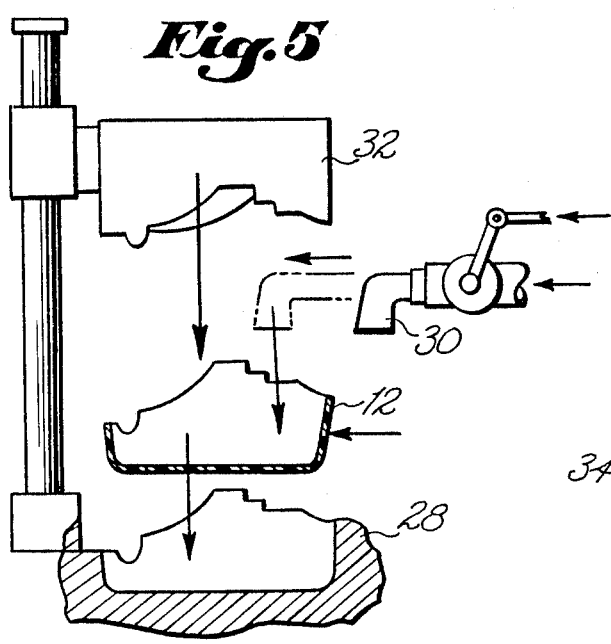
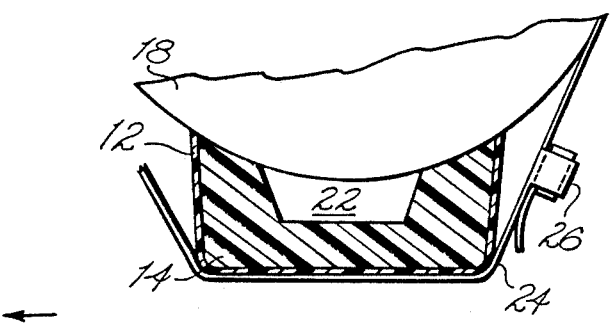
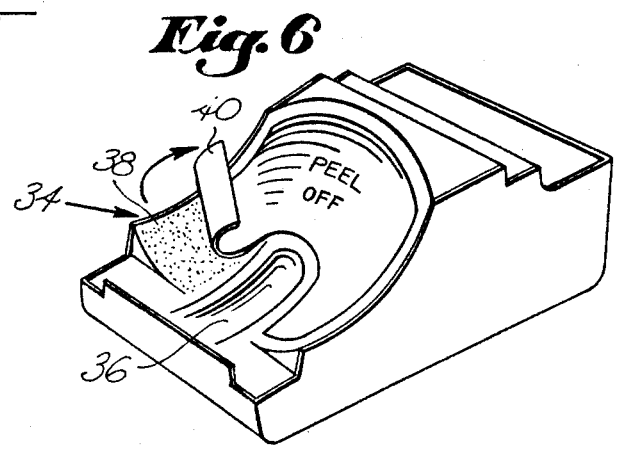

ENGINE OIL LEAK CATCH PAN

BACKGROUND OF THE INVENTION

1. Field of the Invention

This invention relates generally to a pan for catching and holding oil which has leaked from an engine, and more particularly to a disposable pan containing a medium providing a porous filling.

2. Description of Related Art

One will observe in most public parking areas the presence of stains which have been caused by oil leaking from the engines of autos. Regardless of the reason for the leakage, this oil leaves an unsightly stain and portions eventually are washed into the waterways causing additional pollution of these waters.

Despite the prevalance of this leakage problem, I am not aware of any solution other than trying to prevent the leakage by installing new seals or gaskets, and otherwise trying to effect a stoppage of the leak.

The present invention uses a disposable collection device positioned at the location of the leakage which generally occurs at the junction between the engine and the transmission housing. The preferred form of this collection device is a pan which is impervious to oil and a medium contained in the pan to provide a porous filling which will retard movement of collected oil. The upper edges of the pan are contoured to mate with the engine and transmission housing parts they engage so as to limit escape of collected oil. The medium is spaced from the engine and transmission housing at the joint to prevent wicking of the leaking oil. The medium contained in the pan may be an open pored foam which functions to impart some rigidity of the pan as well as holding the oil against movement caused by motion of the vehicle.

It is therefore an object of this invention to provide a disposable catch pan for leaked engine oil which can be secured below the junction of the engine and the transmission housing to collect and hold the oil.

It is a further object of this invention to provide such a disposable catch pan in the form of a pan having an outer surface which is impervious to oil, and which contains a medium providing a porous filling.

In accordance with these and other objects, which will become apparent hereafter, the instant invention will now be described with reference to the accompanying drawings.

BRIEF DESCRIPTION OF THE DRAWINGS

FIG. 1 is an isometric representation of one embodiment of a catch pan in accordance with the invention;

FIG. 2 is a plan view of the catch pan of FIG. 1;

FIG. 3 shows the catch pan of FIG. 1 in a side view cross-section taken on the line 3—3 of FIG. 2 and secured in position for use;

FIG. 4 is the catch pan of FIG. 1 in an end view cross-section taken on the line 4—4 of FIG. 3 and secured in position for use;

FIG. 5 represents apparatus for forming the catch pan of this invention shown in use; and FIG. 6 is an alternate embodiment of the catch pan of this invention.

DETAILED DESCRIPTION OF THE INVENTION

Referring to FIG. 1, catch pan 10 has a shell 12 which is preferably impervious to oil. Contained within shell 12, is a filler medium 14. Medium 14, in the preferred embodiment is an open-pored foam which may be foamed in place within shell 12. A self-skinning foam may be utilized. Medium 14 need not be oil absorbant, but must provide numerous pores or interstices within which the leaked oil which has been caught will be retained. This retards movement of the collected oil in response to accelerations arising from movements of the vehicle. It is also comtemplated that medium 14 may be absorbant. As will be observed in FIGS. 1-4, shell 12 and filler medium 14 have a configuration in the upper portion which is contoured to mate with portions of engine 16 and transmission housing 18. Thus shell 12 has upper edges 20 which mate with engine 16 and the forward part of transmission housing 18. This mating region includes the junction between engine 16 and transmission housing 18 which is the predominant source of engine oil leakage. It will also be observed that the upper surface of medium 14 is spaced from the bottom of the engine/transmission housing junction providing a void 22. This spacing permits the leaking oil to drip onto medium 14 rather than being wicked about the engine and transmission housing permitting it to escape from pan 10.

In FIGS. 3 and 4, catch pan 10 is shown in position. Catch pan 10 in this embodiment is held in position by bands 24 and clamps 26. Bands 24 in these views are metal; however, bands of other materials such as elastic rubber may be substituted.

FIG. 5 represents a forming process in which shell 12 is placed in support 28, filled with a predetermined quantity of a plastic foam mixture from spigot 30, and then covered with die 32 to produce the desired configuration on the upper surface of the cured foam.

FIG. 6 depicts another embodiment of a catch pan 34 having a somewhat differently configured void 36. This embodiment also shows an adhesive surface 38 which is covered by a removable sheet 40. Catch pan 34 in this case is secured in position by cleaning the mating surface of the transmission housing, and then pressing catch pan 34 against it.

It is intended that the entire catch pan device, including both the shell and the filling medium be disposed of after a period of use. This period will vary depending upon the rate of leakage.

It is contemplated that a variation of the basic catch pan device might employ an oil absorbing material, with or without an oil impervious shell. Natural materials such as cotton, and many paper products are oil absorbent; and many manmade materials have this characteristic also.

While the instant invention has been shown and descibed herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

I claim:

1. A disposable catch pan device for catching and holding engine oil which leaks from a vehicle having an engine joined to a transmission housing comprising:

a shell impervious to oil for catching and holding leaked oil;

said shell forming a bottom and sides;

said sides extending up from said bottom to an upper edge contoured to mate with at least a portion of the engine and the transmission housing; and said shell having a foamed open celled material integrally formed with said bottom and said sides of said shell.

2. A disposable catch pan device in accordance with claim 1 wherein:

said open celled material having a void for providing a space for leaked oil to drip.

3. A catch pan device in accordance with claim 1 wherein:

said open celled material is absorbant.

4. A catch pan device in accordance with claim 1 further including:

retaining means for holding said catch pan device in engagement with said engine housing and transmission housing.

5. A catch pan device in accordance with claim 4 wherein:

said retaining means is a band.

6. A catch pan device in accordance with claim 5 wherein:

said band is rubber elastic.

7. A catch pan device in accordance with claim 5 wherein:

said band is metal.

8. A catch pan device in accordance with claim 4 wherein:

said retaining means is adhesive.

9. A catch pan device in accordance with claim 8 wherein:

said adhesive is covered with a removable sheet.

10. A disposable catch pan for catching and holding engine oil which leaks from a vehicle having an engine joined to a transmission housing comprising:

a body of oil absorbant material;

said body having an upper surface configured to mate with at least portions of said engine and said transmission housing;

said body contoured to be spaced form the engine and the transmission housing at the region of joining between the engine and the transmission housing; and an oil impervious shell on surfaces of said body other than said upper surface formed integrally with said body for preventing oil in said body from passing through said shell.

11. A catch pan in accordance with claim 10 further including:

retaining means for removably securing said body to said engine and said transmission housing.

12. A disposable catch pan for catching and holding engine oil which leaks from a vehicle having an engine joined to a transmission housing comprising:

a body of porous material having an upper surface contoured to mate with at least a portion of the engine and the transmission housing;

said body having a void on said upper surface formed a nonmating area;

an oil impervious cover formed integrally with said body forming a bottom and sides on said body.

* * * * *